(12) United States Patent
Graham

(10) Patent No.: US 7,024,792 B2
(45) Date of Patent: Apr. 11, 2006

(54) MEASURING TAPE HOLDING TOOL

(76) Inventor: Braxton B. Graham, 633 Breeds Hill Rd., Virginia Beach, VA (US) 23462

( * ) Notice: Subject to any disclaimer, the term of this patent is extended or adjusted under 35 U.S.C. 154(b) by 0 days.

(21) Appl. No.: 10/431,531

(22) Filed: May 8, 2003

(65) Prior Publication Data
US 2004/0221471 A1   Nov. 11, 2004

(51) Int. Cl.
G01B 3/10   (2006.01)
(52) U.S. Cl. .......................... 33/770; 33/759
(58) Field of Classification Search ................ 33/770, 33/757, 758, 759, 760, 296, 809, DIG. 1; 248/206.5, 309.4, 683; 403/387, 400, DIG. 1; 24/303
See application file for complete search history.

(56) References Cited

U.S. PATENT DOCUMENTS

| | | | | |
|---|---|---|---|---|
| 812,322 | A * | 2/1906 | Badger | 33/27.02 |
| 1,029,767 | A * | 6/1912 | Remington | 7/123 |
| 1,876,744 | A * | 9/1932 | Posgate | 15/104.94 |
| 2,396,877 | A * | 3/1946 | Peterson | 33/770 |
| 2,575,591 | A * | 11/1951 | Klaar | 24/11 C |
| 2,591,333 | A * | 4/1952 | Bellmer | 33/770 |
| 2,644,212 | A * | 7/1953 | Markowitz | 24/11 R |
| 2,795,050 | A * | 6/1957 | Van Fleet | 33/757 |
| 2,964,812 | A * | 12/1960 | Cook | 24/10 R |
| 3,289,305 | A * | 12/1966 | Norton | 33/759 |
| 3,387,341 | A * | 6/1968 | Mates et al. | 24/306 |
| 3,745,663 | A * | 7/1973 | Dodge | 33/759 |
| 4,353,167 | A * | 10/1982 | Martin | 33/770 |
| 4,507,869 | A * | 4/1985 | Stude | 33/42 |
| 4,756,458 | A * | 7/1988 | Clifton | 224/603 |
| 4,827,622 | A * | 5/1989 | Makar | 33/770 |
| 4,924,597 | A * | 5/1990 | Tursi | 33/758 |
| 4,961,451 | A * | 10/1990 | Bucci | 144/28.7 |
| 5,044,805 | A * | 9/1991 | Kosteniuk et al. | 401/82 |
| 5,295,308 | A * | 3/1994 | Stevens et al. | 33/770 |
| 5,481,813 | A * | 1/1996 | Templeton | 33/758 |

(Continued)

FOREIGN PATENT DOCUMENTS

JP   2002116002 A   *   4/2002

OTHER PUBLICATIONS

Web site http://www.flangewizard.com/html/tape_holder.html, "Universal Magnetic Tape Holder Model #89754" by flange wizard tools, date unknown.

*Primary Examiner*—R. Alexannder Smith
(74) *Attorney, Agent, or Firm*—Robert E. Bushnell, Esq.

(57) ABSTRACT

A holder and guide for a measuring tape and a process of making and using the holder. The holder is made up of a hollow tube having a rectangular cross section. The tube has a slit or gap running the length of the tube to enable a measuring tape to be inserted. A magnet is attached to an exterior portion of the tube. The holder enables a user to insert any portion of a measuring tape inside the tube without having to insert the end of the tape measure therein. The holder facilitates in making measurements using a measuring tape, especially when a long distance is being measured and it is inconvenient to insert an end of the measuring tape through the guide to secure a middle portion of the measuring tape during measurement. The holder also has a magnet that attaches the holder to metallic objects enabling a single user to more easily make measurements using a measuring tape.

33 Claims, 8 Drawing Sheets

U.S. PATENT DOCUMENTS

D422,309 S  *  4/2000  Bond .......................... D19/36
6,094,833 A  *  8/2000  Medley, Jr. ................... 33/770
6,663,305 B1 *  12/2003  Poulos ........................ 401/19
2001/0034949 A1 *  11/2001  Chaucer ..................... 33/562

* cited by examiner

MEASURING TAPE HOLDING TOOL

BACKGROUND OF THE INVENTION

1. Field of the Invention

This invention pertains to a device for holding a middle portion of a measuring tape measure in place while making measurements.

2. Description of the Related Art

Measuring tape in tape measures can often be lengthy. Their length can be as much as several hundred feet in length. The measuring tape may be rolled up as a coil within the tape measuring case when the tape measure is not in use. When in use, the end of the measuring tape is pulled and the measuring tape is extracted from the case.

Measuring tapes come in a variety of shapes and sizes. Measuring tape can be made of metal, fiberglass or cloth. The leading end of the measuring tape can have a small, right angled piece of metal attached thereto enabling the user to grip the measuring tape and enabling the end of the measuring tape to be placed on an edge of a structure like a table top when measuring the dimensions of an object. The other end of the measuring tape may be coiled tape inside the case and is carried by the measurer. A problem occurs when the user wishes to measure long distances using measuring tape from a tape measure. Although the small piece of metal at the end of the measuring tape can be secured on an edge of an object, and the other end can be carried by the measurer, a problem occurs in that the middle portions of the measuring tape can move during measurement, especially if the distance being measured is very large. This is because the measuring tape is flexible, and when measuring long distances, the measuring tape often bends and wobbles thereby adding to the difficulty in obtaining an accurate measurement for a long distances.

What is needed is one or more holders that can secure in between portions of the measuring tape between the ends of the measuring tape when making a measurement. The holder is to be tube shaped, but having a slit to enable a middle portion of the measuring tape to be inserted into the holder, instead of requiring an end portion of the measuring tape to be fed through the holder while measuring to secure in between portions of the measuring tape in place when making large measurements. Furthermore, what is needed is a magnet attached to the tape holder(s) to allow the tape holder and thus the measuring tape to be attached to a metallic object during measurements. Such metal objects could be a steel beam on the roof of the structure, a metal object, or a metal wall, floor or roof such as those found in metal shops or ships. Such holder or holders will enable the user to more easily make measurements using the measuring tape of a tape measure in any direction, whether it is up and down or across the floor or ceiling.

SUMMARY OF THE INVENTION

It is therefore an object of the present invention to provide a holder for a measuring tape that can secure in place a middle portion of the measuring tape when a large measurement is taken by a measuring tape.

It is further an object of the present invention to provide an opening in the holder to allow the measuring tape to be inserted into the holder without having to feed through the end of the measuring tape into the holder.

It is also an object of the present invention to provide a magnet attached to the holder to secure the holder and thus the measuring tape to metallic objects and structures.

It is still an object of the present invention to provide a holder or a plurality of holders to enable easier measurements using a measuring tape in all directions, such as up and down, or across a ceiling, floor or some other structure.

It is also an object of the present invention to provide a process for making the measuring tape holder.

It is further an object of the present invention to provide a method for using the measuring tape holder to measure distances in a variety of directions.

These and other objects can be achieved by a guide or holder for a measuring tape. Either the end of the measuring tape can be inserted through the guide or the measuring tape can be inserted into the guide through a slit that runs the entire length of the guide. The guide is essentially tubular in structure to guide a measuring tape that runs within the tube. One side of the tube has a slit opening along the entire length of the guide for insertion of a middle portion of a measuring tape into the guide or holder. Further, the holder or guide has a magnet attached thereto. The magnet can be used for attaching the guide to a metallic object such as a beam, a pipe or a sheet or piece of metal thereby securing a portion of the tape measure in place. By having a middle portion of the measuring tape inserted into the guide, measurements of long distances by a measuring tape becomes much more simpler and more reliable as the measuring tape is not as likely to bend, wobble or move during the course of making a measurement. Attachment of the holder by the magnet to vertical metal structures like a pipe or horizontal structures like a beam makes vertical measurements or horizontal measurements along a ceiling using a measuring tape much more easier, quicker and more reliable, especially if only one person is available to make the measurement. The novel guide can be used with measuring tapes made of various materials such as metal, cloth or fiberglass.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
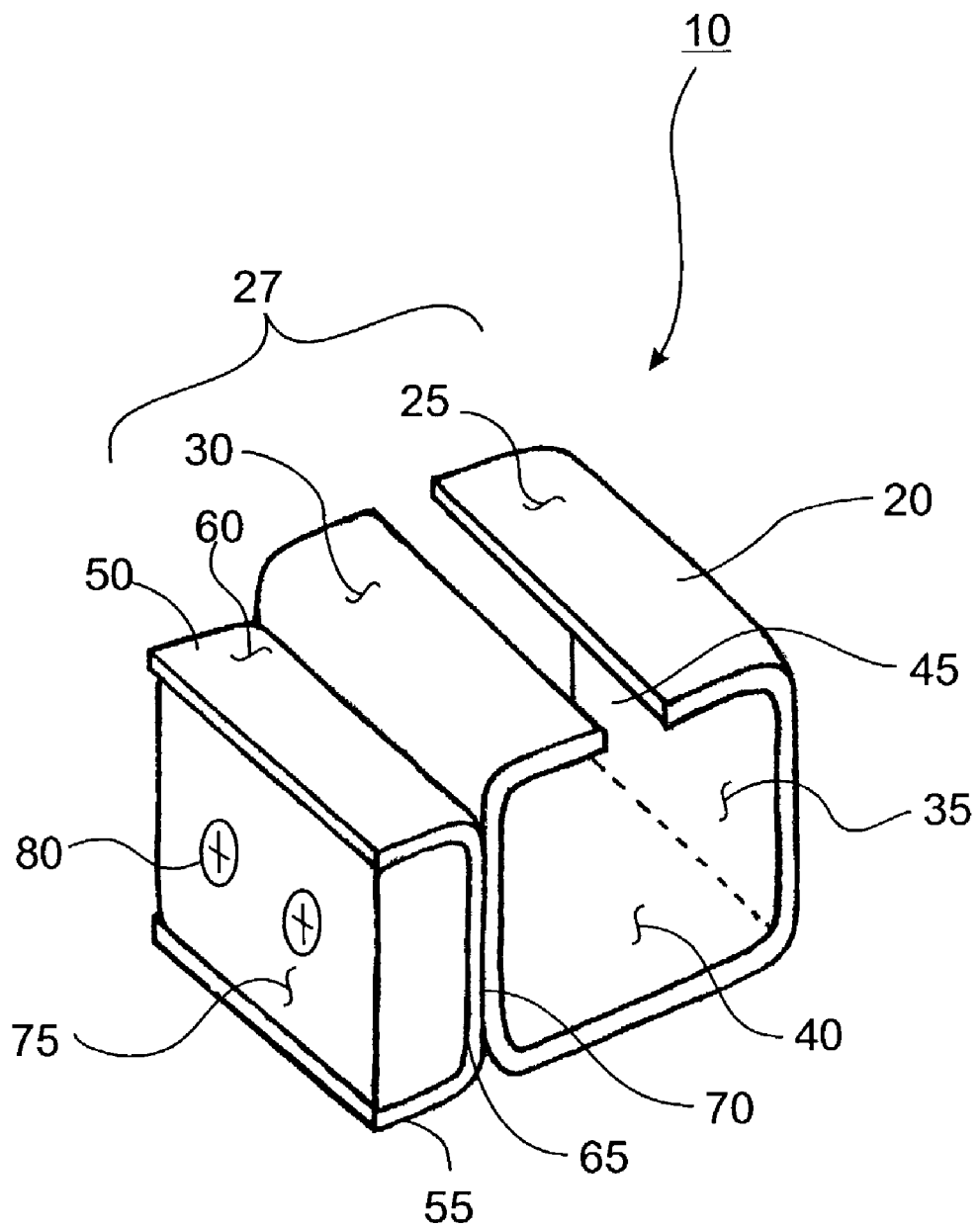
FIG. 1 illustrates a completely assembled measuring tape holder guide according to the principles of the present invention.
Figure 4:
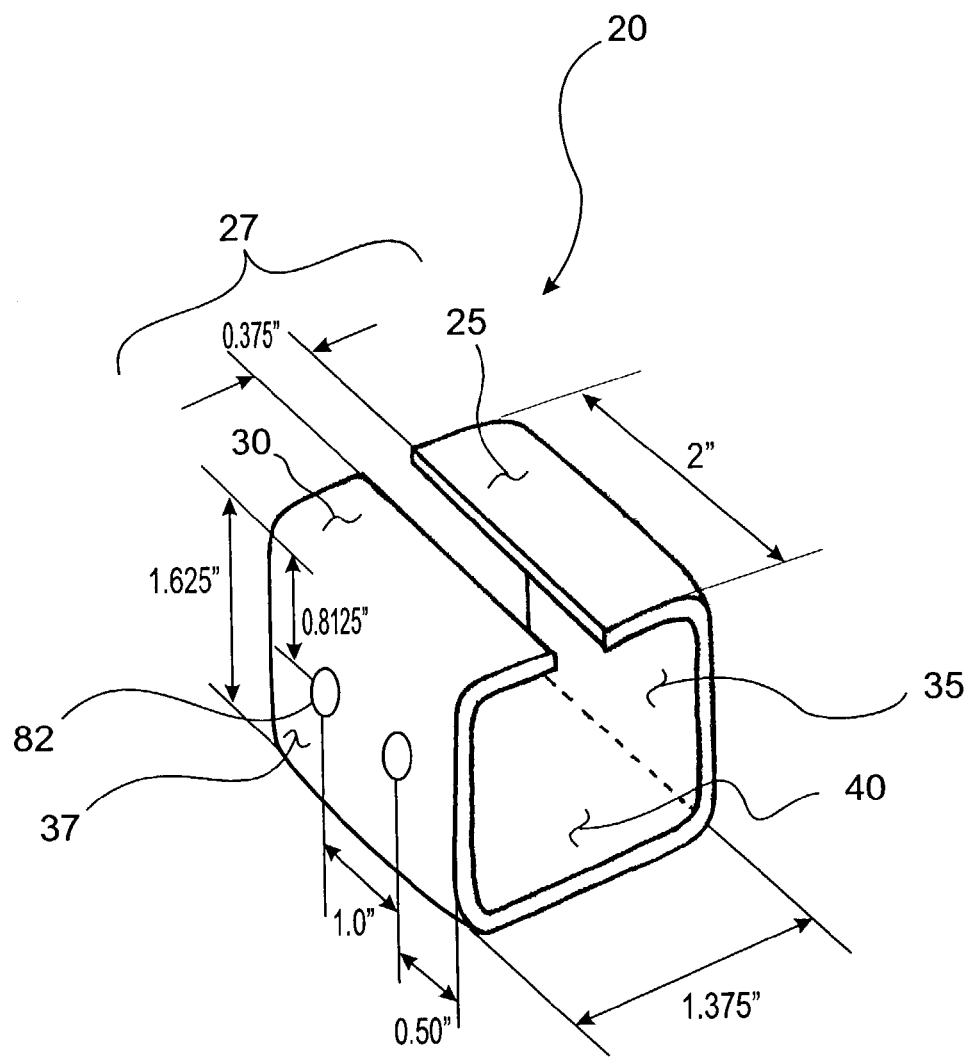
FIG. 4 illustrates the measuring tape holder part of the tape measure holder guide of FIG. 1.

FIG. 1 illustrates a view of a fully assembled measuring tape guide 10 according to the principles of the present invention. The measuring tape guide 10 is made up of measuring tape holder part 20, magnet holder 50 and magnet 75. As illustrated in FIGS 1 and 4, measuring tape holder part 20 is essentially a rectangular-shaped tube with a right side 35, a left side 37, a bottom side 40 and a top side 27. The top side has a slit opening 45 along a length of the top side 27 of measuring tape holder part 20. The top side 27 therefore has a right top portion 25 and a left top portion 30 divided by slit 45. The tape holder part 20 may be of some other cross sectional shape, but rectangular is preferred.

Figure 5:
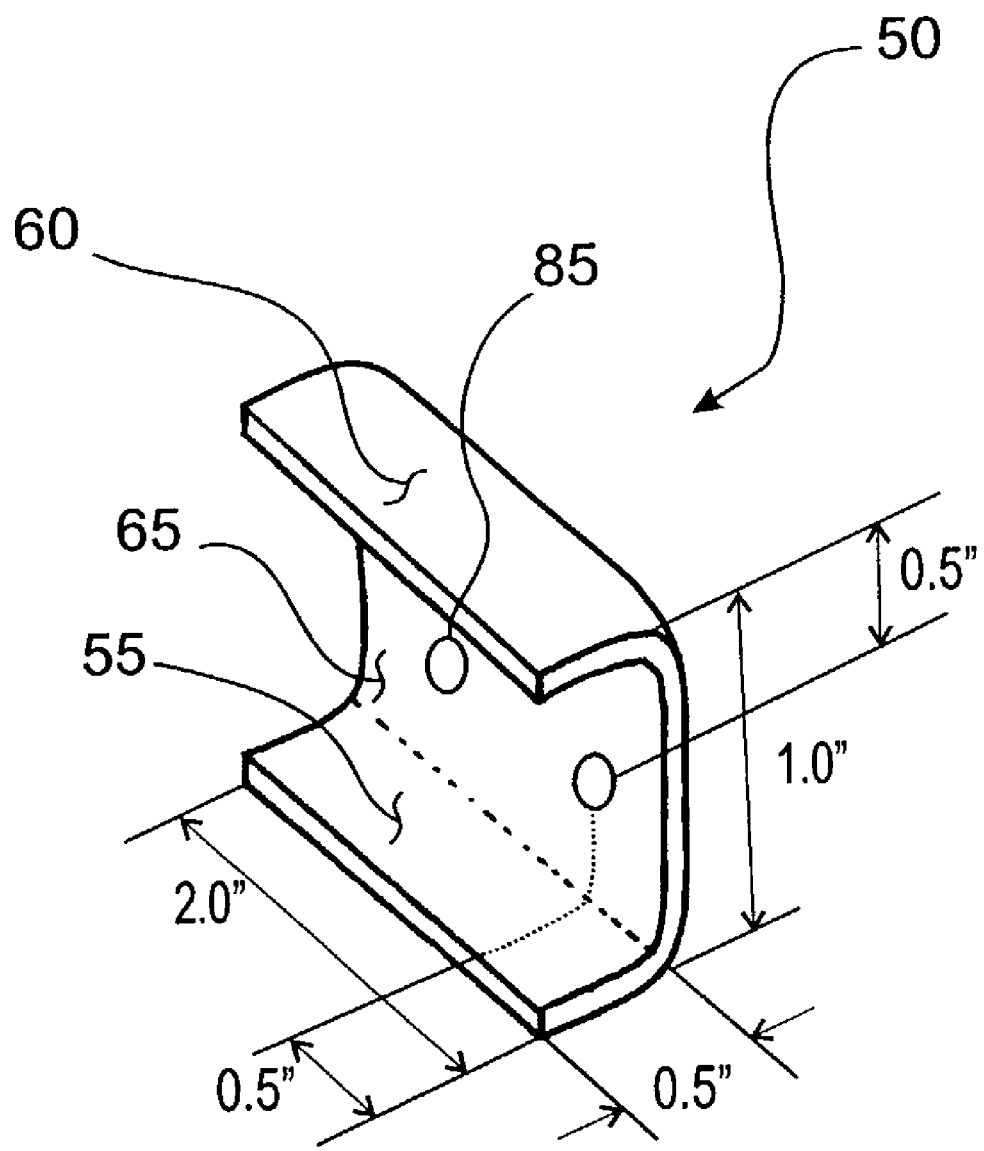
FIG. 5 illustrates the magnet holder part of the measuring tape holder guide of FIG. 1.

Attached to the left side 37 of measuring tape holder part 20 is a U-shaped magnet holder part 50. As illustrated in FIGS. 1 and 5, the magnet holder part 50 has a top side 60, a bottom side 55 and a right side 65. The right side 65 joins the top side 60 with the bottom side 55 of magnet holder part 50. The right side 65 of magnet holder part 50 is welded to the left side 37 of measuring tape holder part 20 by weld 70. Alternatively, the right side 65 of magnet holder part could instead be welded to right side 35 of measuring tape holder part 20. I have found that it is not preferable to weld magnet holder part 50 to the bottom side 40 (the side opposite from slit 45) of tape holder part 20 as the measuring tape, in such a configuration, could fall out through the slit 45 if the magnet 75 is attached to a metallic ceiling structure such as a metallic beam. Preferably, weld 70 is actually four tack welds of 0.125×0.375 inches long and 0.125 inches in from each corner, but other weld configurations are possible. Magnet holder part 50 is absent a left side so that magnet 75 can be inserted into magnet holder part 50.

Magnet 75 is preferably glued to magnet holder part 50 via glue and is also attached to the magnet holder 50 and measuring tape holder part 20 via screws 80. I have found that absent the screws 80, the magnet 75 would separate from the magnet holder part 50 if tape measure guide 10 is dropped. Therefore, screws 80 and the accompanying screw holes are highly recommended. Holes for screws 80 are drilled through magnet 75, through the right side 65 of magnet holder 50 and through the left side 37 of measuring tape holder 20. The holes drilled in magnet holder 50 and measuring tape holder 20 are preferably via a drill with a #29 drill bit and preferably tapped for a #8 machine screw. The holes drilled through magnet 75 are often done before assembly in a mass production environment. Preferably, the diameter of the drill holes are 0.187 inches with a 0.12 inch countersink with a 100 degree angle.

Figure 2:
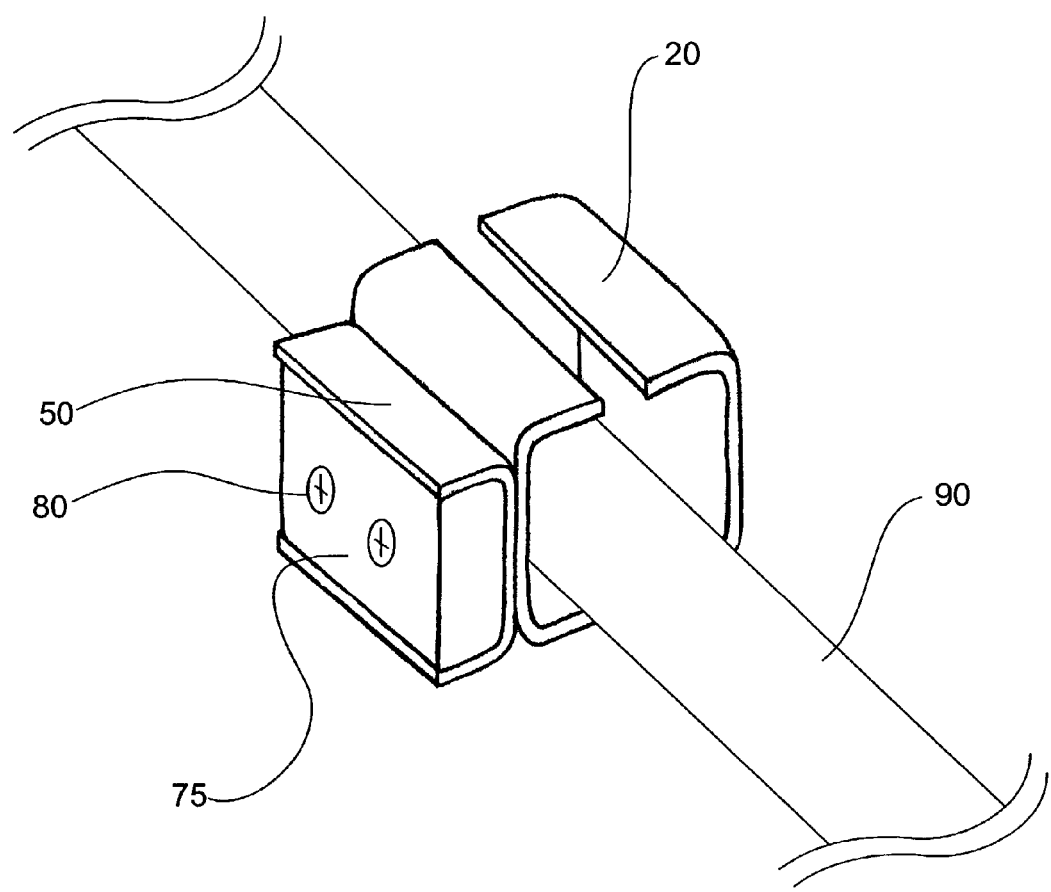
FIG. 2 illustrates the measuring tape holder guide of FIG. 1 guiding a measuring tape according to the principles of the present invention.

FIG. 2 illustrates measuring tape guide 10 of FIG. 1 with measuring tape 90 disposed within measuring tape holder part 20. Measuring tape 90 may be made of metal, fiberglass or cloth. Measuring tape 90 is inserted into measuring tape holder part 20 through slit 45. Slit 45 enables measuring tape 90 to be inserted within the measuring tape holder part 20 without requiring an end of the measuring tape to be fed through the measuring tape holder part 20. This slit 45 feature can come in handy when the tape measure is very long and the measuring tape guide 10 is to secure a middle portion of the measuring tape 90. In such a scenario, it would be inconvenient to have to feed the tape in through the tape holder part 20. Slit 45 prevents the necessity of having to feed through the entire measuring tape 90 in order for measuring tape guide 10 to guide or hold tape 90.

Figure 3:
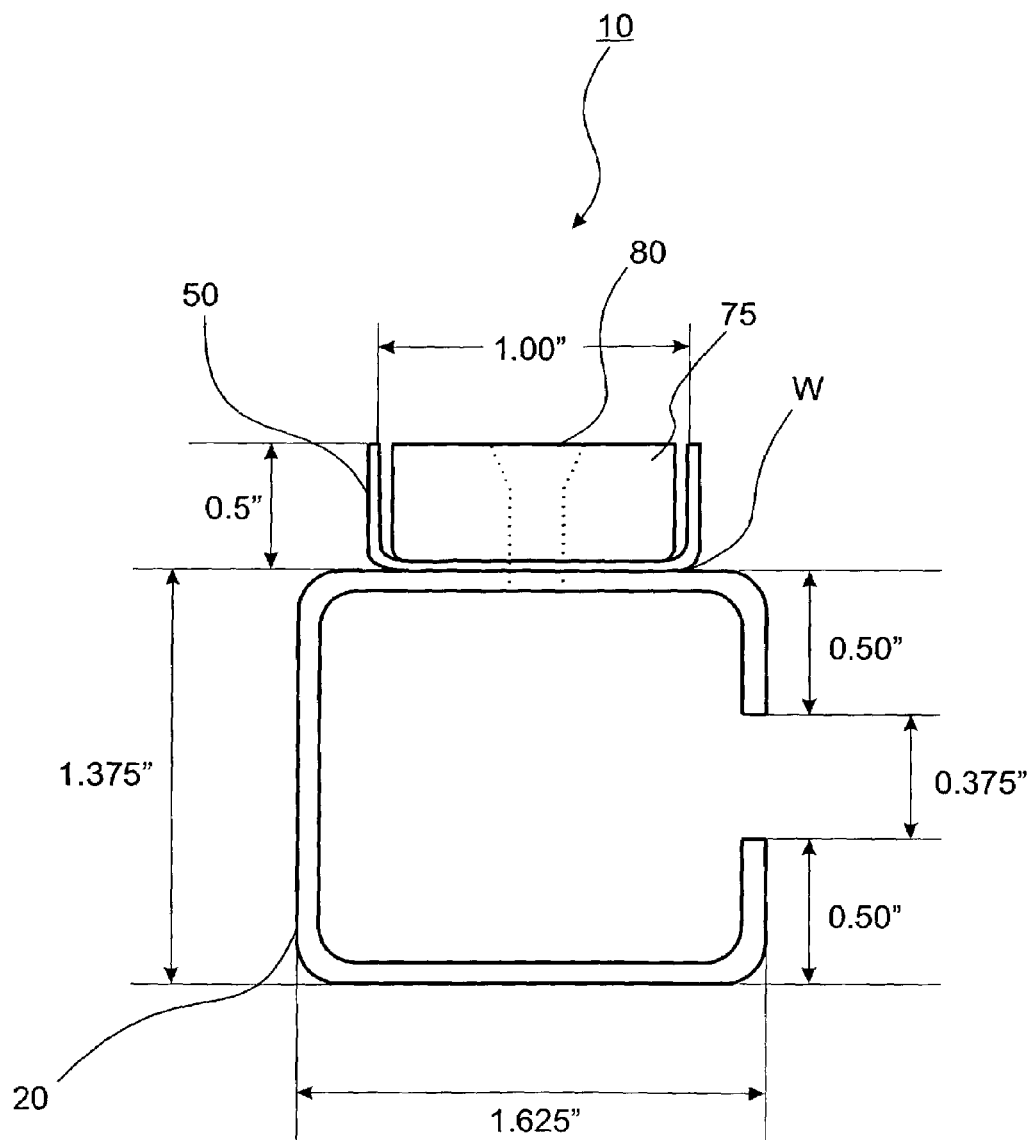
FIG. 3 illustrates a end view of the measuring tape measure holder guide guiding a measuring tape according to the principles of the present invention.

FIG. 3 illustrates an end view of the measuring tape guide 10 illustrated in FIG. 1. Like FIG. 2, the measuring tape guide 10 is made up of measuring tape holding part 20 with slit 45 extending the length of the measuring tape holder part. Magnet holder 50 is attached by welds W to one of the two external surfaces of the measuring tape holder part that is adjacent to the portion of the measuring tape holding part that bears the slit 45. Magnet 75 is disposed within the magnet holder 50 and is permanently attached to the magnet holder 50 and the measuring tape holding part 20 by screws 80 and glue.

FIG. 4 illustrates measuring tape holder part 20. FIG. 4 illustrates the preferable dimensions of the tape holder part 20. In no way is this invention limited to the exact dimensions illustrated in FIG. 4.

Preferably, tape holder part 20 is preferably made of 14 gauge A 36 steel, however, in no way is this invention limited to the exact materials mentioned. For example, the tape holder part 20 could instead be made of plastic. Top side 27, bottom side 40, left side 37 and right side 35 are preferably 2 inches in length. Left side 37 and right side 35 are 1.625 inches tall. Bottom side 40 is preferably 1.375 inches wide. Slit 45 is preferably 0.375 inches wide thereby leaving right top side 25 and left top side 30 preferably 0.5 inches wide. Holes 82 for screws 80 are disposed on a side (37 as illustrated or 35) of the tape holder part 20 that is adjacent to the side bearing the slit 45 and preferably not on a side 40 of the measuring tape part that is opposite to the slit 45. FIG. 4 illustrates the preferred positioning of the holes 82, however, in no way is this invention limited to the exact dimensions listed in FIG. 4.

FIG. 5 illustrates magnet holder 50. FIG. 5 illustrates the preferred dimensions of magnet holder 50. Preferably, magnet holder part 50 is made of 14 gauge A 36 steel however it is also possible to use plastic. Preferably, top side 60 and bottom side 55 are 2 inches long and 0.5 inches wide. Preferably, right side 65 is 2 inches long and 1.0 inch high. Holes 85 are drilled to accommodate the screws 80. Holes 85 must line up with and be the same size as holes 82 in FIG. 4 for the invention to work. In no way is magnet holder part 50 limited by the dimensions and materials specified herein. Right side 65 of magnet holder has an inside side and an outside side. It is the outside side of right side 65 that is welded to the tape holder part 20 and it is the inside side of side 65 that is glued to the magnet 75.

Figure 6:
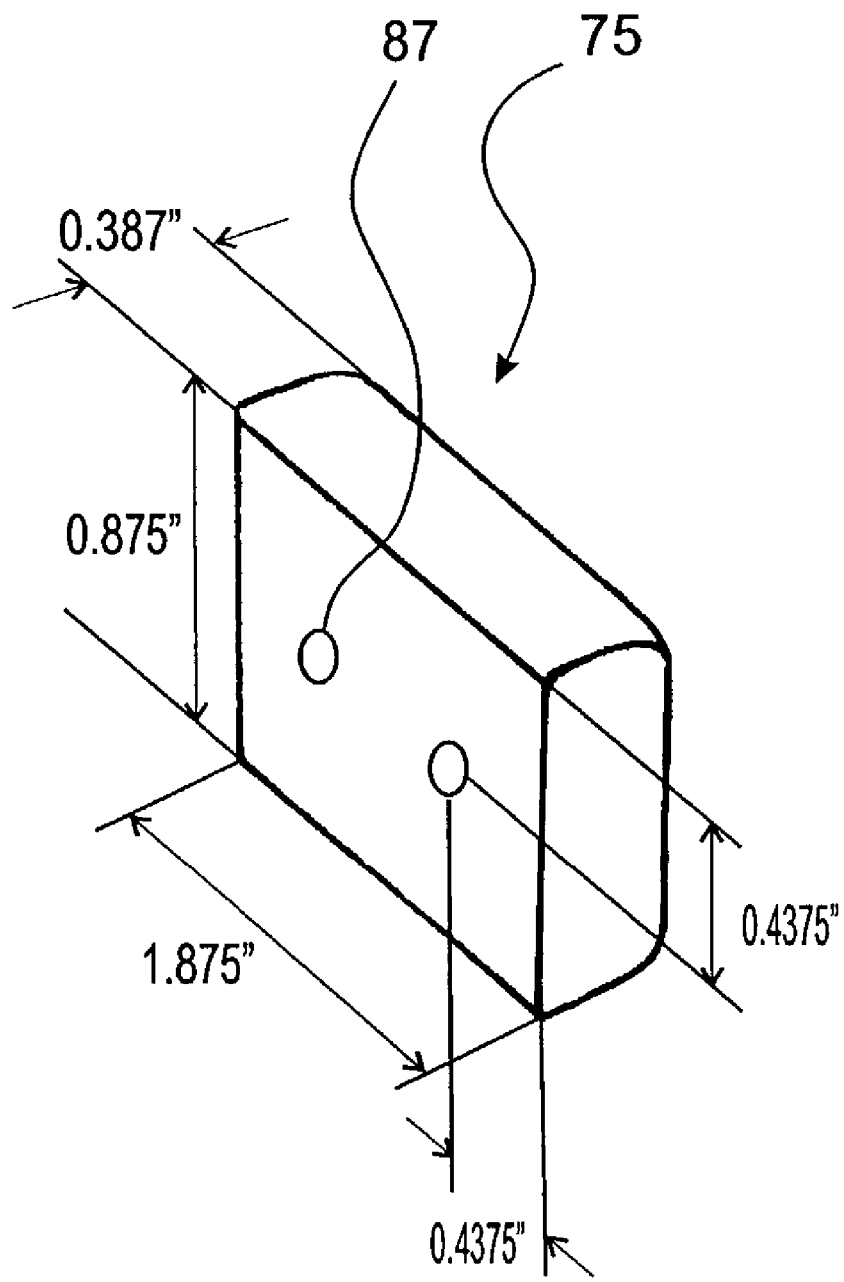
FIG. 6 illustrates the magnet found in the measuring tape holder guide of FIG. 1.

FIG. 6 illustrates magnet 75. Preferably, magnet 75 is 0.387 inches thick, 0.875 inches high and 1.875 inches long. Holes 87 are formed before production to accommodate screws 80. Holes 87 must line up and be the same size as holes 85 in FIG. 5 and holes 82 in FIG. 4 in order to properly fasten magnet 75 to magnet holder 50 and tape holder part 20 via screws 80. In no way is magnet 75 limited to the dimensions of FIG. 6.

Now, the process for making the measuring tape guide 10 will be described. Magnets 75 with holes 87 are formed in a mass production environment. Then, the right side 65 of magnet holder 50 is welded to the left side 37 of tape holder part 20. Instead, the magnet holder 50 can be welded to the right side 35 of tape holder part 20, but for this explanation, it will be assumed that the magnet holder 50 is welded to the left side 37 of tape holder part 20. Then, the holes 85 in the magnet holder and the holes 82 in the tape holder part are drilled and tapped. The combination of magnet holder 50 welded to tape holder part 20 is then sandblasted to clean the parts. Masking tape is then placed on the inside side of right side 65 of magnet holder 50. This is because this inside side of side 65 of magnet holder 50 will later be glued to the magnet 75 and it is preferred that this inside side of right side 65 is not painted before the glueing. This is because painting the surfaces used for glueing may provide a poorer bond than if the glued surfaces are not painted. Then, the combination magnet holder 50 welded to the tape holder part 20 is painted, preferably by spray paint. After the painting, the masking tape is removed from the inside surface of right side 65 of magnet holder 50. Glue is applied to the inside surface of right side 65 of magnet holder 50 and to one side of the magnet 75. Then, the magnet 75 is attached to the magnet holder 50 so that the holes 87 line up with the holes 85 and 82. Lastly, the screws 80 are inserted into the holes 87 of magnet 75, the holes 85 of the magnet holder 50 and holes 82 of the tape holder part 20 thereby completing the construction process. The above described process for making measuring tape holder 10 is the preferred process but in no way is the only way to build the measuring tape holder 10.

Figure 7:
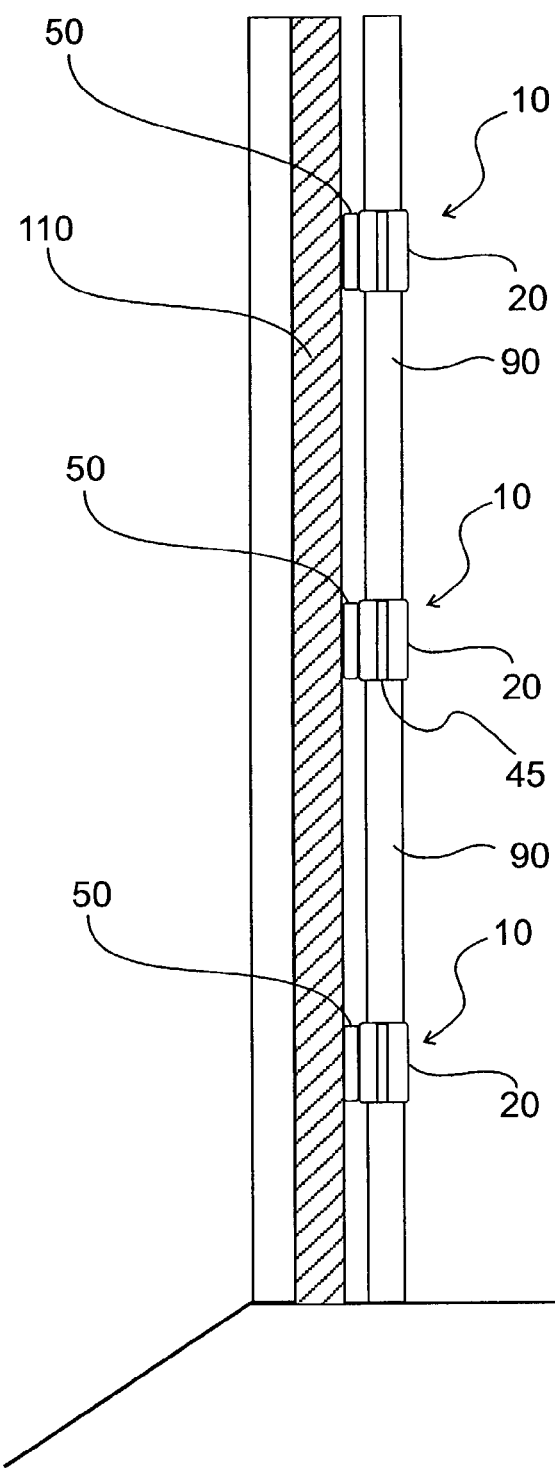
FIG. 7 illustrates one of many uses for the measuring tape holder part for making a vertical measurement.

Turning to FIG. 7, FIG. 7 illustrates the one use for a plurality of measuring tape holders for measuring a vertical distance along a metallic pipe. As illustrated in FIG. 7, pipe 110 runs up and down in a room. A plurality of measuring tape holders 10 are attached to pipe 110. It is the magnet 75 in magnet holder 50 that is stuck onto the pipe 110. Then, tape 90 is inserted into the slits 45 of tape holder part 20 of measuring tape guide 10 to measure a distance in the vertical direction. Because of the presence of the plurality of measuring tape holders 10 stuck to pipe 110, a vertical measurement can more easily be made, especially if there is only one person present to make the measurement.

Figure 8:
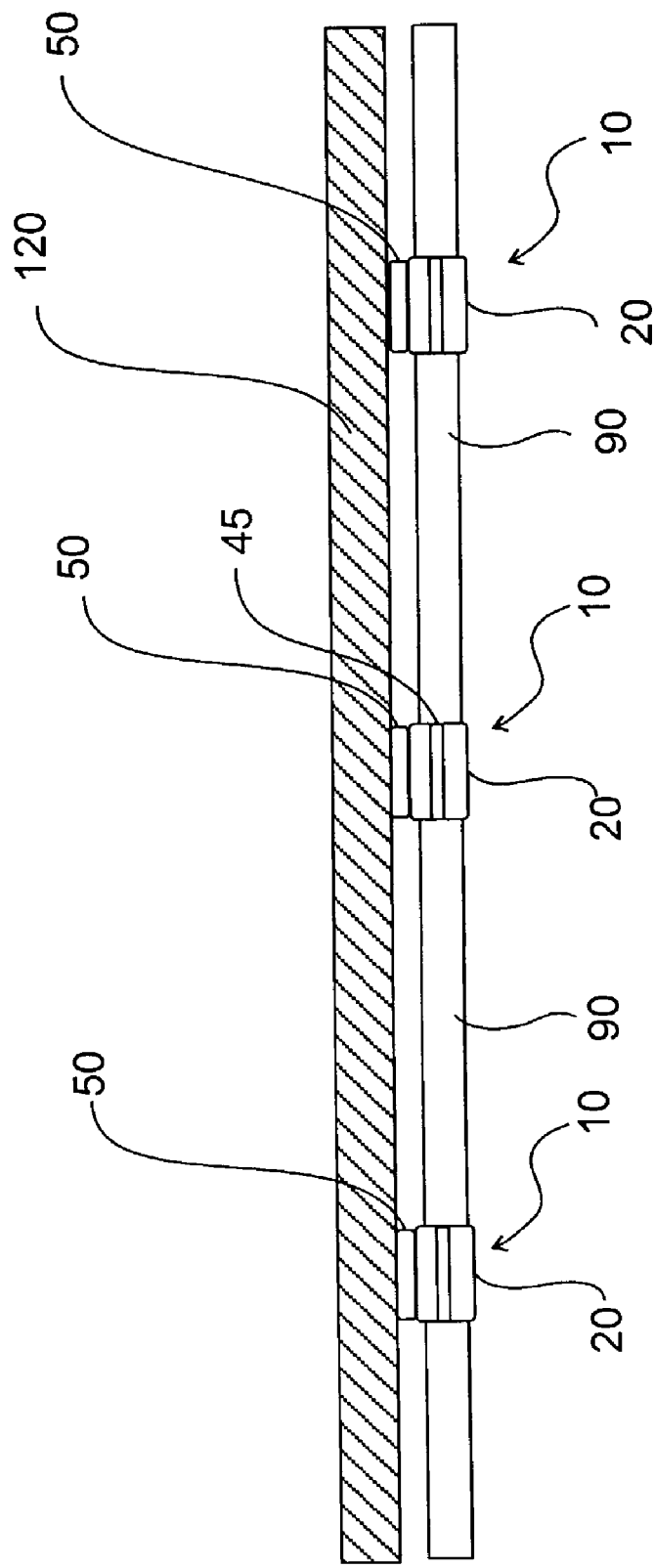
FIG. 8 illustrates another use for the novel measuring tape holder for measuring a horizontal distance along a ceiling.

FIG. 8 illustrates another use for a plurality of measuring tape holders 10. In FIG. 8, there is a horizontal beam 120 that runs across a ceiling. As in FIG. 7, the measuring tape holders are placed on the horizontal beam 120 by attaching the magnet 75 of each measuring tape holder 10 to the beam 120. After the measuring tape holders 10 are attached to the beam 120, the user inserts measuring tape 90 into slit 45 of each measuring tape holder 10 to make the measurement. Since the magnet 75 and the magnet holder 50 are attached to an exterior surface of the tape holder part 20 that is adjacent to and not opposite to the exterior surface bearing the slit 45, the tape 90 will not fall out through slit 45 in the arrangement of FIG. 8 when a measurement is being made. This is because the slit 45 is facing sideways and not down, preventing the tape 90 from inadvertently falling out through slit 45 during the measurement. By using the measuring tape holder 10 in the strategic manner as illustrated in FIG. 8, a single person can much more easily make measurements along a ceiling with a measuring tape of a tape measure.

It is to be appreciated that measuring tape holder 10 is not limited in any way by the uses illustrated in FIGS. 7 and 8. Measuring tape holder 10 is an all position tool capable of making measuring tape measurements easier in all directions.

It is to be appreciated that the present holder enables easy securing of a measure tape at a middle portion of the measuring tape when a measurement is taking place without requiring the user to feed through the entire tape into each holder. The holder secures a middle or in between portion of the tape in place making it easier to make big measurements in any direction using a measure tape. As illustrated in FIGS. 7 and 8, many holders may be used in making a measurement using a measuring tape, especially if the distance being measured is very large.

It is noted that the present invention is not limited to the preferred embodiment described above, and it is apparent that variations and modifications by those skilled in the art can be effected within the spirit and scope of the present invention defined in the appended claims.

What is claimed is:

1. A guide, comprising:
a channel having open opposite terminal ends longitudinally aligned and forming an elongate rule passage adapted to continuously accommodate unobstructed entry and unresisted movement of an elongate rule through said channel, said channel being formed by a plurality of flat sidewalls with a first of said sidewalls perforated by a longitudinally extending opening exposing to observation any scale borne by the rule; and
a permanent magnet mounted upon a second and different one of said sidewalls next to said first of said sidewalls and exterior to said channel.

2. The guide of claim 1, comprising a holder interposed between said channel and said magnet and attached to said second of said sidewalls to expose a major surface of said magnet most distant from said second of said sidewalls.

3. A guide, comprising:
a permanent magnet; and
a channel having open opposite terminal ends longitudinally aligned and forming an elongate rule passage adapted to continuously accommodate unobstructed entry and unresisted passage of an elongate rule through said channel while shielding the rule from said permanent magnet, said channel being formed by a plurality of flat sidewalls with a first of said sidewalls perforated by a longitudinally extending opening exposing to observation any scale borne by the rule and with said permanent magnet being mounted upon a second and different one of said sidewalls next to said first of said sidewalls and exterior to said channel.

4. The guide of claim 3, comprising a holder interposed between said channel and said magnet and attached to said second of said sidewalls to expose a major surface of said magnet most distant from said second of said sidewalls.

5. A process of making a guide, comprising:
creating a channel having open opposite terminal ends longitudinally aligned and forming an elongate rule passage adapted to continuously accommodate unobstructed entry and unresisted movement of an elongate rule through said channel, by forming said channel with a plurality of distinct sidewalls with a first of said sidewalls perforated by a longitudinally extending opening exposing to observation any scale borne by the rule; and
mounting a permanent magnet upon a second and different one of said sidewalls next to said first of said sidewalls and exterior to said channel.

6. The process of claim 5, comprised of interposing a holder between said channel and said magnet and attaching said holder to said second of said sidewalls to expose a major surface of said magnet most distant from said second of said sidewalls.

7. A measuring tape holding apparatus, comprising:
a tube having a rectangular cross section, wherein said tube is closed except for a narrow slit extending a length of said tube wherein said tube forms an elongate rule passage adapted to accommodate entry and unresisted movement of an elongate rule through said tube; and
a magnet attached to an exterior surface of said tube.

8. The apparatus of claim 7, further comprising a U-shaped piece attached to an exterior surface of said tube wherein an open portion of said U-shaped piece faces away from said tube, said magnet being disposed within said U-shaped piece.

9. The apparatus of claim 8, said tube having four exterior surfaces, wherein one of said four exterior surfaces having said slit parallel to an axis of said tube and running an entire length of said tube, said U-shaped piece being attached to one of said four exterior surfaces and not to said exterior surface bearing said slit.

10. The apparatus of claim 9, said U-shaped piece being attached to one of said four exterior surfaces of said tube that is adjacent to said exterior surface having said slit.

11. The apparatus of claim 8, said U-shaped piece covering nearly all of said exterior surface the U-shaped piece is attached to, said magnet covering a substantial area of said U-shaped piece.

12. The apparatus of claim 7, said tube having four exterior surfaces, wherein one of said four exterior surfaces having said slit parallel to an axis of said tube and running an entire length of said tube.

13. The apparatus of claim 12, said slit dividing one of said four exterior surfaces in half.

14. The apparatus of claim 12, said four exterior surfaces being flat.

15. The apparatus of claim 12, said tube having four flat interior surfaces.

16. The apparatus of claim 12, said length of said tube being two inches, said slit being less than 0.5 inches wide and each of said four exterior surfaces being greater than one inch wide.

17. The apparatus of claim 7, said tube having four exterior surfaces, said magnet covering almost all of said exterior surface the magnet is attached to.

18. The apparatus of claim 7, said magnet being perforated by a first hole, the side of the tube comprising the exterior surface the magnet is attached to being perforated by a second hole, said first hole being aligned with said second hole.

19. The apparatus of claim 18, further comprising a first screw extending through said first hole and through said second hole and fastening together said magnet to said tube.

20. The apparatus of claim 7, said tube having a plurality of flat exterior surfaces and a plurality of interior surfaces.

21. An apparatus for holding a middle portion of a measuring tape, comprising:
    a section of a hollow metal tube having a rectangular cross section having an open section, said tube having four exterior surfaces, wherein one of said four exterior surfaces is divided by a gap serving as said open section, said gap extending an entire length of said section of tube, said gap running parallel to an axis of said tube; wherein said section of tube forms an elongate rule passage adapted to accommodate entry and unresisted movement of an elongate rule through said tube; and
    a magnet attached to one of said four exterior surfaces, said magnet attached to an exterior surface that is adjacent to said exterior surface divided by said gap.

22. The apparatus of claim 21, said gap having a width that is a small fraction of a width of each of said four exterior surfaces, said width of each of said four exterior surfaces being perpendicular to a length of said section of tube.

23. The apparatus of claim 22, further comprising a U-shaped piece attached to one of said four exterior surfaces of said tube, said U-shaped piece being open in a direction away from said tube, said magnet being disposed within said U-shaped piece.

24. The apparatus of claim 21, said tube further comprising four flat interior surfaces, wherein one of said four interior surfaces being divided by said gap extending an entire length of said tube.

25. The apparatus of claim 21, said magnet being perforated by a first hole, a side of said tube that has said one of said four exterior surfaces that the magnet is attached to being perforated by a second hole, said first hole being aligned to the second hole, the apparatus further comprising a first screw extending through both said first hole and said second hole and binding together said hollow metal tube to said magnet.

26. The apparatus of claim 21, said tube having a plurality of flat exterior surfaces and a plurality of flat interior surfaces.

27. A measuring tape holding apparatus, comprising:
    a section of a rigid hollow tube, said section having open end portions wherein said section and said open end portions forms an elongate rule passage adapted to continuously accommodate unobstructed movement of a length of measuring tape through said section, said section having a slit running an entire length of said section from a first end to a second end; and
    a magnet disposed on an exterior of said section of a hollow tube.

28. The apparatus of claim 27, said magnet being disposed near said slit but not covering said slit.

29. The apparatus of claim 28, said magnet being permanently attached to said section of said hollow tube.

30. The apparatus of claim 29, said slit being at least 0.25 inches wide, said section of said hollow tube being no more than 3 inches long.

31. The apparatus of claim 27, said slit extending from one open end portion to another open end portion.

32. The apparatus of claim 27, said magnet being perforated by a first hole, the side of the tube with the exterior surface of said tube the magnet is attached to being perforated by a second hole, said first hole being aligned with said second hole.

33. The apparatus of claim 32, further comprising a first screw extending through said first hole and through said second hole and fastening together said magnet to said tube.

* * * * *